(12) United States Patent
Hawie et al.

(10) Patent No.: US 11,971,173 B2
(45) Date of Patent: Apr. 30, 2024

(54) TWO-STAGE COMBUSTOR FOR GAS TURBINE ENGINE

(71) Applicant: Pratt & Whitney Canada Corp., Longueuil (CA)

(72) Inventors: Eduardo Hawie, Woodbridge (CA); Nigel Davenport, Hillsburgh (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/383,966

(22) Filed: Jul. 23, 2021

(65) Prior Publication Data

US 2021/0348764 A1 Nov. 11, 2021

Related U.S. Application Data

(63) Continuation of application No. 15/210,213, filed on Jul. 14, 2016, now abandoned, which is a continuation of application No. 13/313,305, filed on Dec. 7, 2011, now Pat. No. 9,416,972.

(51) Int. Cl.
| | |
|---|---|
| F23R 3/34 | (2006.01) |
| F02C 3/10 | (2006.01) |
| F02C 3/14 | (2006.01) |
| F23R 3/00 | (2006.01) |
| F23R 3/06 | (2006.01) |
| F23R 3/16 | (2006.01) |
| F23R 3/26 | (2006.01) |
| F23R 3/50 | (2006.01) |

(52) U.S. Cl.
CPC ............... *F23R 3/346* (2013.01); *F02C 3/10* (2013.01); *F02C 3/14* (2013.01); *F23R 3/002* (2013.01); *F23R 3/06* (2013.01); *F23R 3/16* (2013.01); *F23R 3/26* (2013.01); *F23R 3/50* (2013.01); *F05B 2220/302* (2013.01); *F05D 2240/35* (2013.01); *F05D 2250/141* (2013.01)

(58) Field of Classification Search
CPC .. F23R 3/002; F23R 3/16; F23R 3/346; F23R 3/46; F23R 3/50
See application file for complete search history.

(56) References Cited

U.S. PATENT DOCUMENTS 5,284,019 A * 2/1994 Vdoviak ................... F23R 3/02
                                                          60/747
5,421,158 A * 6/1995 Stenger ..................... F23R 3/50
                                                          60/747

(Continued)

*Primary Examiner* — Arun Goyal
(74) *Attorney, Agent, or Firm* — Getz Balich LLC

(57) ABSTRACT

A combustor for a gas turbine engine comprises an inner annular liner wall and an outer annular liner wall cooperating to form a combustion chamber of the combustor. A first dome wall has a circumferential array of first fuel injection bores. A second dome has a circumferential array of second fuel injection bores. An intermediate wall extends between the first dome wall and the second dome wall. A first combustion stage is defined by the inner liner wall forward end, the first dome wall and the intermediate wall. A second combustion stage is defined at least by the outer liner wall forward end, the second dome wall and the intermediate wall, the first combustion stage communicating with the first fuel injection bores, the second combustion stage communicating with the second fuel injection bores.

1 Claim, 4 Drawing Sheets

(56) References Cited

U.S. PATENT DOCUMENTS

| | | | | |
|---|---|---|---|---|
| 5,970,716 A | * | 10/1999 | Forrester | F23R 3/50 |
| | | | | 60/800 |
| 6,058,710 A | * | 5/2000 | Brehm | F23R 3/34 |
| | | | | 60/747 |
| 6,334,297 B1 | * | 1/2002 | Dailey | F23R 3/04 |
| | | | | 60/785 |
| 7,716,931 B2 | * | 5/2010 | Mancini | F23R 3/50 |
| | | | | 60/737 |

* cited by examiner

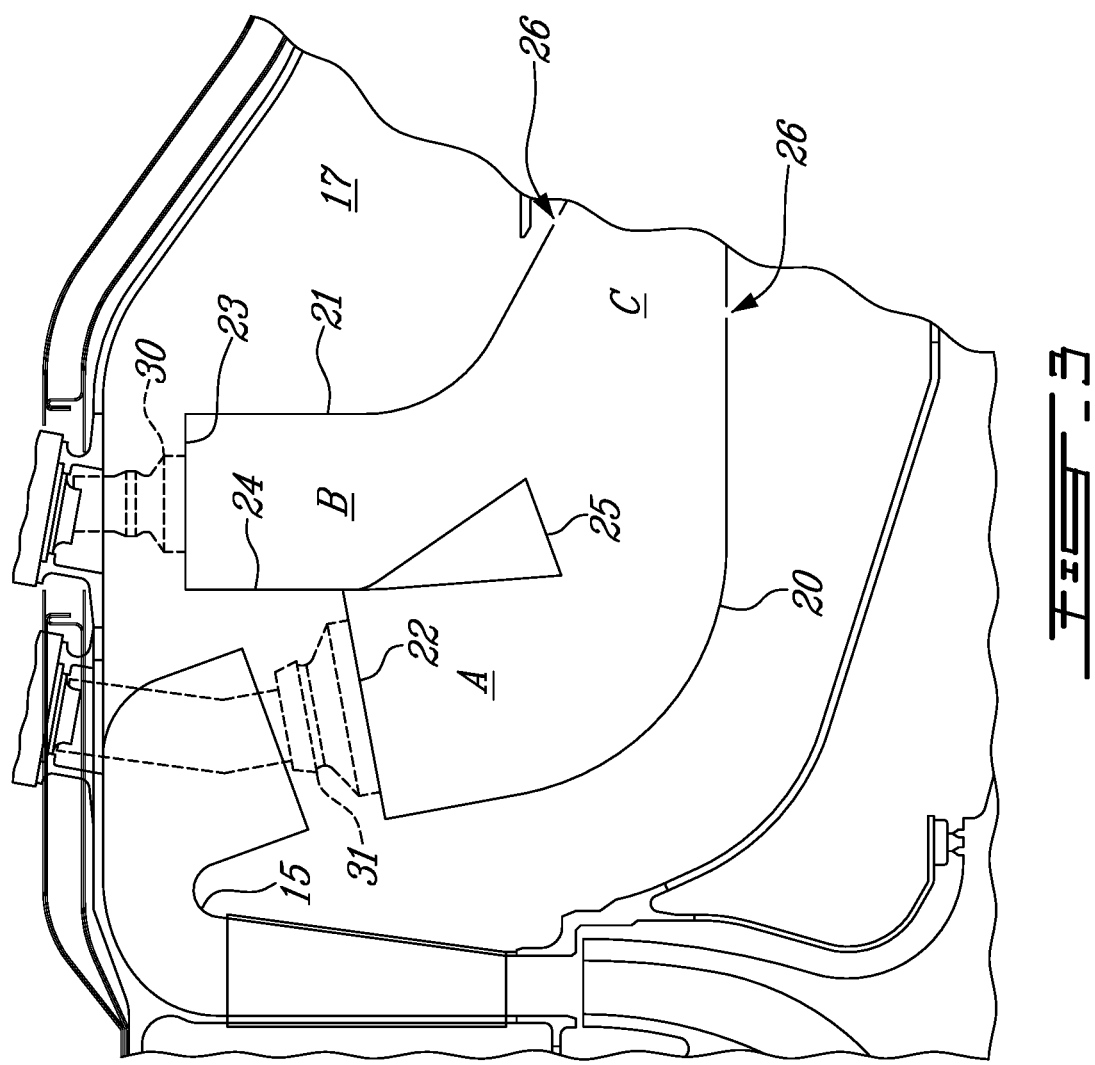

TWO-STAGE COMBUSTOR FOR GAS TURBINE ENGINE

TECHNICAL FIELD

The application relates generally to gas turbine engines and, more particularly, to two-stage combustors.

BACKGROUND OF THE ART

In two-stage combustors, the combustor is comprised of two sub-chambers, one for the pilot stage of the burner, and the other for the main stage of the burner. The pilot stage operates the engine at low power settings, and is kept running at all conditions. The pilot stage is also used for operability of the engine to prevent flame extinction. The main stage is additionally operated at medium- and high-power settings. The arrangement of two-stage combustors involves typically complex paths, and may make avoiding dynamic ranges with their increased-complexity geometry more difficult. Also, problems may occur in trying to achieve a proper temperature profile. Finally, durability has been problematic.

SUMMARY

In one aspect, there is provided a combustor for a gas turbine engine, the engine having a central axis, the combustor comprising: an inner annular liner wall having an axially forward end generally radially oriented, the inner annular liner wall curving into an axial orientation as it extends in an aft direction to an axially aft end of the inner liner; an outer annular liner wall having an axially forward end generally radially oriented, the outer annular liner wall curving into an axial orientation as it extends in an aft direction to an axially aft end of the outer liner, with the inner annular liner wall and the outer annular liner wall spaced apart and cooperating to form a combustion chamber of the combustor; a first dome wall extending generally axially adjacent to the inner annular liner wall and circumscribing the forward end on the inner liner, the first dome wall having a circumferential array of first fuel injection bores radially extending through the first dome wall; a second dome wall extending generally axially adjacent to the outer annular liner wall and circumscribing the forward end of the outer liner, the second dome wall having a circumferential array of second fuel injection bores radially extending through the second dome wall; and an intermediate wall extending between the first dome wall and the second dome wall and being an intermediate single annular wall, a first combustion stage defined at least by the inner liner wall forward end, the first dome wall and the intermediate wall, a second combustion stage defined at least by the outer liner wall forward end, the second dome wall and the intermediate wall, the first combustion stage communicating with the first fuel injection bores, the second combustion stage communicating with the second fuel injection bores.

In a second aspect, there is provided a gas turbine engine comprising: a casing defining a plenum; a combustor within the plenum comprising: an inner annular liner wall having an axially forward end generally radially oriented, the inner annular liner wall curving into an axial orientation as it extends in an aft direction to an axially aft end of the inner liner; an outer annular liner wall having an axially forward end generally radially oriented, the outer annular liner wall curving into an axial orientation as it extends in an aft direction to an axially aft end of the outer liner, with the inner annular liner wall and the outer annular liner wall spaced apart and cooperating to form a combustion chamber of the combustor; a first dome wall extending generally axially adjacent to the inner annular liner wall and circumscribing the forward end on the inner liner, the first dome wall having a circumferential array of first fuel injection bores radially extending through the first dome wall; a second dome wall extending generally axially adjacent to the outer annular liner wall and circumscribing the forward end of the outer liner, the second dome wall having a circumferential array of second fuel injection bores radially extending through the second dome wall; and an intermediate wall extending generally radially between the first dome wall and the second dome wall and being an intermediate single annular wall, a first combustion stage defined at least by the inner liner wall forward end, the first dome wall and the intermediate wall, a second combustion stage defined at least by the outer liner wall forward end, the second dome wall and the intermediate wall, the first combustion stage communicating with the first fuel injection bores, the second combustion stage communicating with the second fuel injection bores; a compressor diffuser having at least one outlet within the plenum; and fuel injectors and/or valves disposed in communication the fuel injection bores.

Further details of these and other aspects of the present invention will be apparent from the detailed description and figures included below.

DESCRIPTION OF THE DRAWINGS

Reference is now made to the accompanying figures, in which:

FIG. 3 is a schematic view of the two-stage combustor of FIG. 2, with diffusers and staging valves;

DETAILED DESCRIPTION OF EMBODIMENTS

Figure 1:
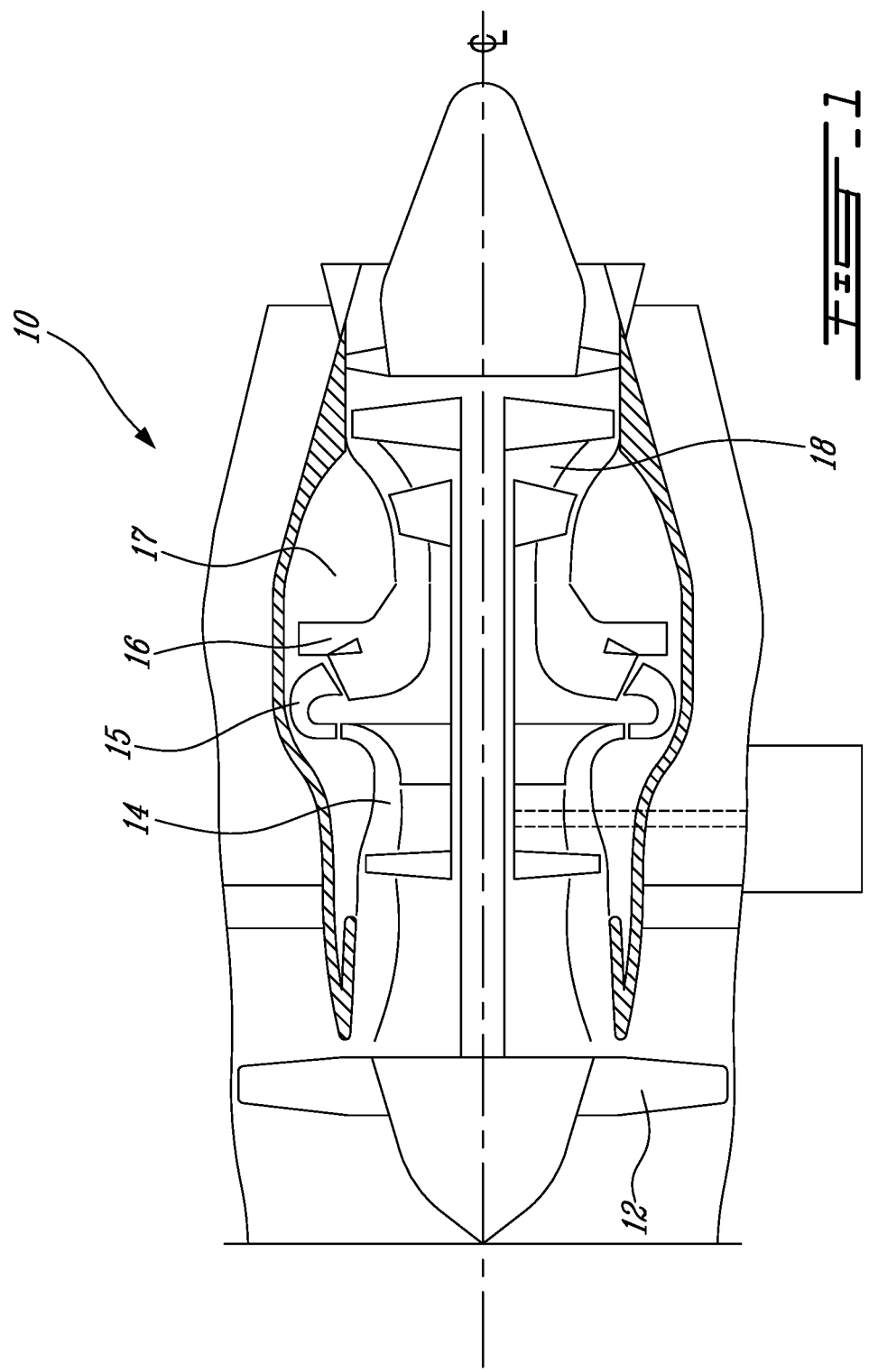
FIG. 1 is a schematic cross-sectional view of a turbofan gas turbine engine with a two-stage combustor in accordance with the present disclosure.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a plurality of curved radial diffuser pipes 15 in this example, a combustor 16 in which the compressed air is mixed with fuel and ignited for generating an annular stream of hot combustion gases, a plenum 17 defined by the casing and receiving the radial diffuser pipes 15 and the combustor 16, and a turbine section 18 for extracting energy from the combustion gases. The combustor 16 is a two-stage combustor in accordance with the present disclosure.

Figure 2:
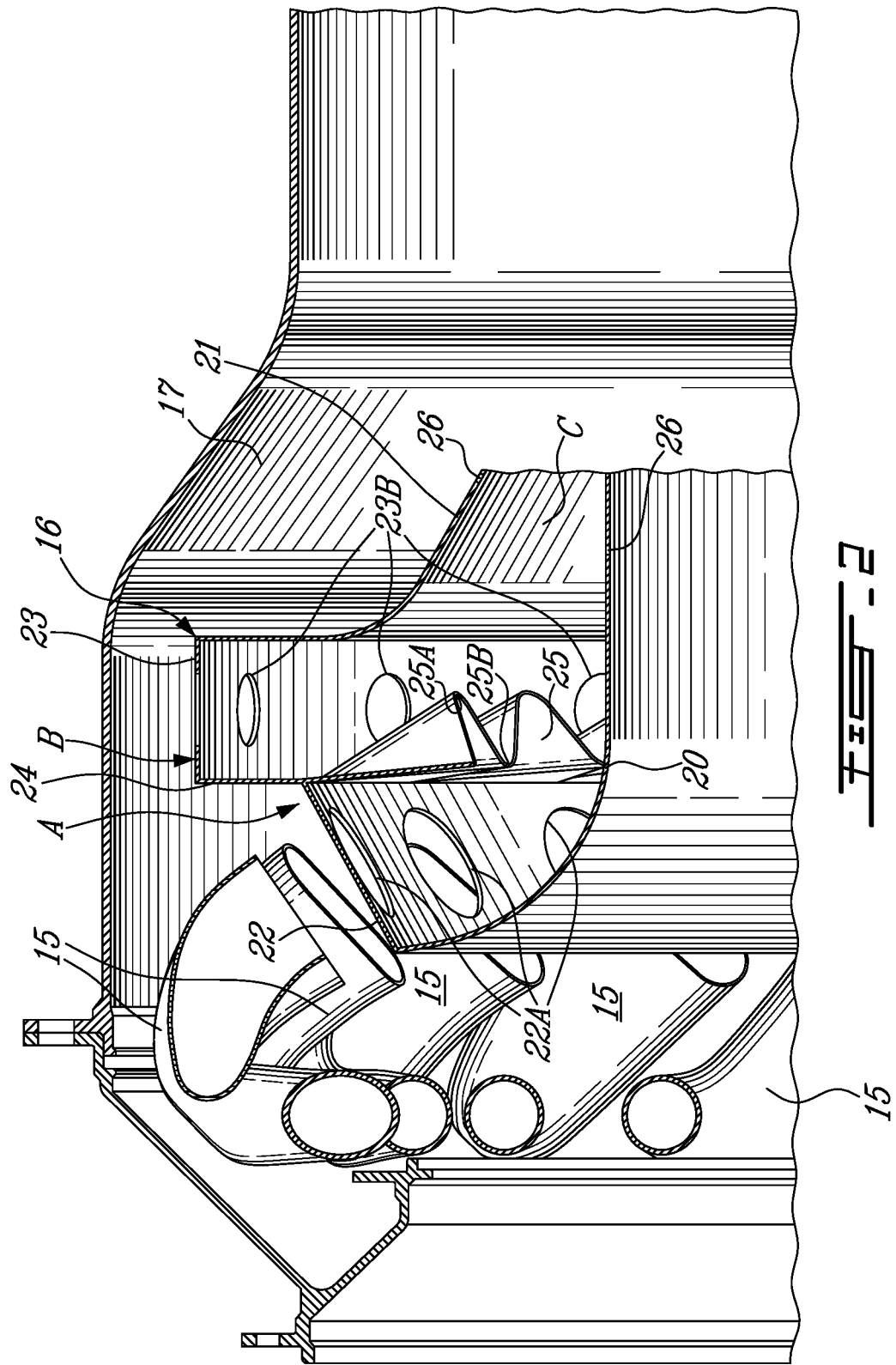
FIG. 2 is an enlarged sectional view, fragmented, of the two-stage combustor of the present disclosure.

Referring to FIG. 2, the combustor 16 of the present disclosure is shown in greater detail. The combustor 16 has an annular geometry, with an inner liner wall 20, and an outer liner wall 21 concurrently defining the combustion chamber therebetween. The inner liner wall 20 has a fore end oriented generally radially relative to the engine centerline, with the inner liner wall 20 curving into an axial orientation relative to the engine centerline. Likewise, the outer liner wall 21 has a fore end oriented generally radially relative to the engine centerline, with the outer liner wall 21 curving into an oblique orientation relative to the engine centerline.

A dome interrelates the inner liner wall 20 to the outer liner wall 21. The dome is the interface between air/fuel injection components and a combustion chamber. The dome has a first end wall 22 (i.e., dome wall) sharing an edge with the inner liner wall 20. The first end wall 22 may be in a non-parallel orientation relative to the engine centerline. Injection bores 22A are circumferentially distributed in the first end wall 22.

A second end wall 23 (i.e., dome wall) of the dome shares an edge with the outer liner wall 21. The second end wall 23 may be in a generally parallel orientation relative to the engine centerline, or in any other suitable orientation. Injection bores 23B are circumferentially distributed in the first end wall 23. In the illustrated embodiment, the first end wall 22 may be wider than the second end wall 23.

An intermediate wall 24 of the dome may join the first end wall 22 and the second end wall 23, with the second end wall 23 being positioned radially farther than the first end wall 22 (by having a larger radius of curvature than that of the first end wall 22 relative to the engine centerline). The intermediate wall 24 may be normally oriented relative to the engine centerline. In this example, mixing features extend into the combustion chamber from the dome walls. The mixing features may be a mixer wall 25 extending from the intermediate wall 24 and projects into an inner cavity of the combustor 16. The mixer wall 25 may have a lobed annular pattern, as illustrated in FIG. 2, with a succession of peaks and valleys along a circumference of the mixer wall 25. The lobed mixer wall 25 in between the stages can be made out of composite materials (e.g. CMC) or metal. Although not shown, the lobed mixer wall 25 may be cooled by conventional methods (i.e., louvers, effusion and/or back side cooling).

Accordingly, as shown in FIGS. 2 and 3, the combustor 16 comprises a pair of annular portions, namely A and B, merging into an aft portion C of the combustor 16. The annular portion A is defined by the inner liner wall 20, the first end wall 22 and a fore surface of the mixer wall 25. The annular portion B is defined by the outer liner wall 21, the second end wall 23, the intermediate wall 24, and an aft surface of the mixer wall 25. Dilution ports 26 may be defined in the liners of the aft portion C, to trim the radial profile of the combustion products.

Either one of the annular portions A and B may be used for the pilot stage, while the other of the annular portions A and B may be used for the main combustion stage. Referring to FIG. 3, as an example, the annular portion B is used for the pilot stage. In this example, the main combustion stage, represented by the annular portion A, has a larger volume than the pilot stage. Moreover, in this example, the main combustion stage is entirely axially forward of the second combustion stage.

Accordingly, injectors 30 are schematically illustrated as being mounted to the combustor outer case and as floating on the annular portion B, in register with respective floating collars at injection bores 23B, for the feed of plenum air and fuel to the annular portion B of the combustor 16. The annular portion A is used as the main stage in the case of having only fuel staging. The injectors 31 for annular portion A may have the same attachment arrangement as the injectors for the annular portion B. In the case of air staging, the annular portion A could act as the pilot section if it is considered convenient. Staging valves can be located in either location and, at the same time, they can act as support for the combustor, as well as acting as staging valves and fuel nozzle/swirlers.

Figure 5:
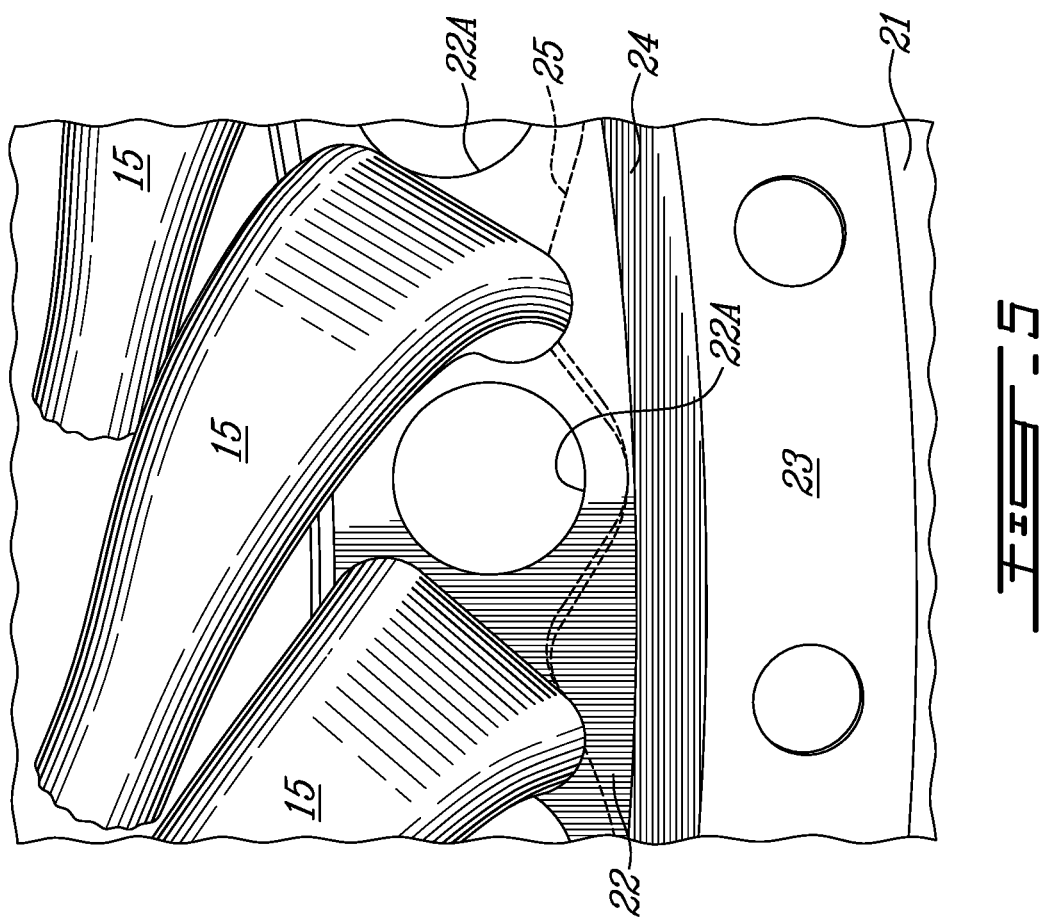
FIG. 5 is an enlarged perspective view of end walls of the two-stage combustor, showing an arrangement between a lobed mixer wall and fore injection ports.
Figure 4:
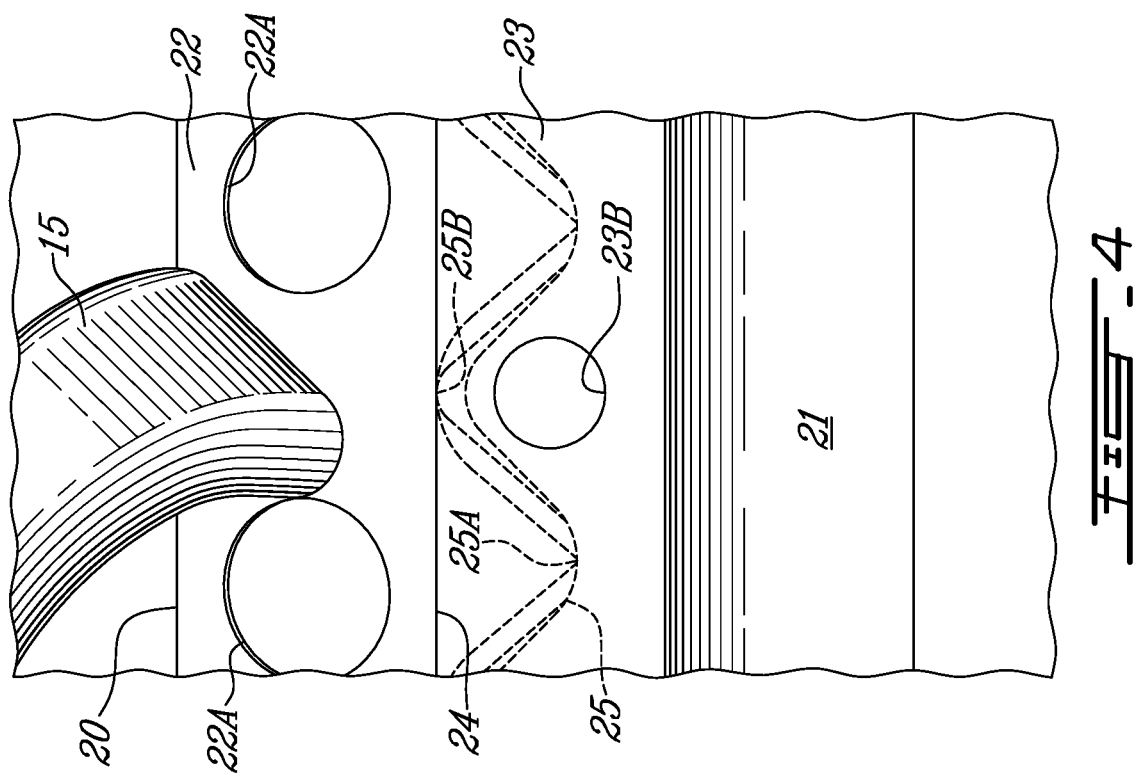
FIG. 4 is an enlarged perspective view of end walls of the two-stage combustor, showing an arrangement between a lobed mixer wall and aft injection ports.

Referring to FIG. 4, the injection bores 23B of the annular portion B (with injectors 30 removed for illustration purposes) are shown as being in radial register with valleys of the lobed mixer wall 25. Referring to FIG. 5, the injection bores 22A of the annular portion A (with staging valves/injectors 31 removed for illustration purposes) are shown as being in radial register with valleys of the lobed mixer wall 25. Therefore, the injection bores 22A and 23B are circumferentially offset from one another, as shown in FIGS. 4 and 5. As shown in FIGS. 2 and 3, the injection bores are also radially offset from one another by reason of the larger radius of the second end wall 23. Moreover, as shown in both FIGS. 4 and 5, ends of passages of the diffuser pipes 15 are located between the injection bores 22A (i.e., in circumferential offset), but in circumferential alignment with the bores 23B. Therefore, there is a clearance opposite the injection bores 22A, thus defining a volume for the installation and presence of injectors or staging valves.

Referring to FIG. 2, bottom edges 25A of each of the valleys of the mixer wall 25 in the annular portion A are approximately normal to the first end wall 22, at intersections therebetween. Likewise, bottom edges of each of the valleys of the mixer wall 25B are approximately normal to the second end wall 23, at intersections therebetween. In both cases, other orientations between valleys and end walls are also possible.

The arrangement of the combustor 16 may be well suited for engines with centrifugal compressors, and may be used for fuel and/or air staging since the front end of the combustor may be readily accessible and close to the outer case. This could enable the use of actuators for controlling air splits or flow splits on the outside of the combustor chamber, since the mechanisms can be placed outside the plenum 17.

The above description is meant to be exemplary only, and one skilled in the art will recognize that changes may be made to the embodiments described without departing from the scope of the invention disclosed. Any suitable liner configurations and dome shapes may be employed. The intermediate wall may have any suitable configuration, and need not be a lobed mixer but may have other mixing features or no mixing function at all. The fuel nozzles may be of any suitable type and provided in any suitable orientation. The fuel nozzles may be fed from common stems or from a common source. Any suitable diffuser arrangement may be used, and pipe type diffusers are not required nor is the radial arrangement depicted in the above examples. For example, a vane diffuser may be provided in preference to a pipe diffuser. Where axial compression is provided, another suitable arrangement for diffusion may be provided. Still other modifications which fall within the scope of the present invention will be apparent to those skilled in the art, in light of a review of this disclosure, and such modifications are intended to fall within the appended claims.

What is claimed is:

1. A combustor for a gas turbine engine, comprising:
an inner liner wall including a radial inner liner wall portion at a first axial forward end of the inner liner wall and an axial aft inner liner wall portion at a first axial aft end of the inner liner wall;
an outer liner wall including a radial outer liner wall portion at a second axial forward end of the outer liner wall and an axial aft outer liner wall portion at a second axial aft end of the outer liner wall, the outer liner wall circumscribing the inner liner wall, and a combustion chamber formed between the inner liner wall and the outer liner wall:

a forward dome wall connected to and projecting axially out from the inner liner wall at the first axial forward end of the inner liner wall, the forward dome wall configured with an array of forward injection bores extending radially through the forward dome wall:

an aft dome wall connected to and projecting axially out from the outer liner wall at the second axial forward end of the outer liner wall, the aft dome wall configured with an array of aft injection bores extending radially through the aft dome wall:

an intermediate wall connected to the forward dome wall and the aft dome wall, the intermediate wall extending radially outward from an axial aft end of the forward dome wall to an axial forward end of the aft dome wall; and a mixer wall projecting radially inward from a radially inner end of the intermediate wall, the mixer wall configured with an array of axial forward facing valleys and an array of axial aft facing valleys, wherein a first forward injection bore in the array of forward injection bores is circumferentially aligned with a first forward facing valley in the array of axial forward facing valleys, and a first aft injection bore in the array of aft injection bores is circumferentially aligned with a first aft facing valley in the array of axial aft facing valleys;

wherein the mixer wall comprises a panel of material;

wherein the panel of material has a thickness that extends between a forward surface of the panel of material and an aft surface of the panel of material;

wherein the forward surface of the panel of material forms the array of axial forward facing valleys; and wherein the aft surface of the panel of material forms the array of axial aft facing valleys.

\* \* \* \* \*